US008311021B2

(12) United States Patent
Saifullah et al.

(10) Patent No.: US 8,311,021 B2
(45) Date of Patent: Nov. 13, 2012

(54) METHOD, SYSTEM AND COMPUTER PROGRAM PRODUCT FOR PROVIDING SESSION INITIATION/DELIVERY THROUGH A WLAN TO A TERMINAL

(75) Inventors: Yousuf Saifullah, Flower Mound, TX (US); Stefano Faccin, Dallas, TX (US); Naveen Kumar Kakani, Irving, TX (US); Khiem Le, Coppell, TX (US)

(73) Assignee: Nokia Corporation, Espoo (FI)

( * ) Notice: Subject to any disclaimer, the term of this patent is extended or adjusted under 35 U.S.C. 154(b) by 927 days.

(21) Appl. No.: 11/425,624

(22) Filed: Jun. 21, 2006

(65) Prior Publication Data

US 2007/0297373 A1 Dec. 27, 2007

(51) Int. Cl.
*H04W 4/00* (2009.01)

(52) U.S. Cl. .......................... 370/338; 370/329; 370/318

(58) Field of Classification Search .................. 455/436, 455/422.1, 437, 418, 442, 432, 552.1, 41.2, 455/343.2–343.5; 370/338, 331, 328, 329, 370/318
See application file for complete search history.

(56) References Cited

U.S. PATENT DOCUMENTS

| 7,133,669 | B2* | 11/2006 | Nair et al. ................... 455/432.1 |
| 7,505,446 | B2* | 3/2009 | Pecen ............................ 370/338 |
| 7,536,186 | B2* | 5/2009 | Dorenbosch et al. ......... 455/440 |
| 2002/0085516 | A1* | 7/2002 | Bridgelall ...................... 370/329 |
| 2002/0147008 | A1* | 10/2002 | Kallio ............................ 455/426 |
| 2003/0118015 | A1* | 6/2003 | Gunnarsson et al. ......... 370/389 |
| 2004/0087307 | A1* | 5/2004 | Ibe et al. ........................ 455/436 |
| 2005/0255879 | A1* | 11/2005 | Shi et al. .................... 455/552.1 |
| 2006/0099935 | A1* | 5/2006 | Gallagher et al. .......... 455/414.1 |
| 2007/0140157 | A1* | 6/2007 | Fu et al. ......................... 370/318 |
| 2008/0058003 | A1* | 3/2008 | Rydnell et al. ............. 455/552.1 |

\* cited by examiner

*Primary Examiner* — Kent Chang
*Assistant Examiner* — Kuo Woo
(74) *Attorney, Agent, or Firm* — Alston & Bird LLP (57) ABSTRACT

A method for saving power, at a mobile terminal, includes receiving a call, at a network entity, wherein the call contains information relating to transmission of the call from the network entity to the mobile terminal. The mobile terminal operates in first and second communications networks, which are different. The mobile terminal detects coverage of the first communications network and activates a first interface corresponding to the first communications network. The mobile terminal can also deactivate the first interface and activate a second interface corresponding to the second communications network while the mobile terminal is located in both the first and second communications networks. The mobile terminal can then enter a low power consumption mode supported by the second communications network. The mobile terminal can also deactivate the low power consumption mode and activate the first interface to communicate with the first communications network when a call is delivered via the first communications network.

21 Claims, 7 Drawing Sheets

METHOD, SYSTEM AND COMPUTER PROGRAM PRODUCT FOR PROVIDING SESSION INITIATION/DELIVERY THROUGH A WLAN TO A TERMINAL

TECHNOLOGICAL FIELD

Embodiments of the present invention relate generally to mobile electronic device technology and, more particularly, relate to methods, systems, and computer program products for saving power at mobile electronic devices which operate in a plurality of communications networks.

BACKGROUND

Voice communication is evolving from circuit-switched technology, such as provided by the Public Switched Telephone Network (PSTN) or Public Land Mobile Network (PLMN), to packet-switched technology, such as provided by Voice over IP (VoIP) techniques across IP Networks. Indeed, the Internet Engineering Task Force (IETF) has developed IP-based protocols to perform various functions in VoIP communications. In particular, for example, Session Initiation Protocol (SIP), specified in IETF request for comment document RFC 2543, has been developed for establishing voice calls between two parties. In contrast, Real-time Transport Protocol (RTP), specified in IETF request for comment document RFC 1889, has been developed to format packetized voice to be carried over the Internet once the call has been established.

At the same time as voice communication is evolving, wireless networks are evolving from circuit-switched voice networks (e.g., GSM, IS-136, IS-95) to packet-switched networks (e.g., WLAN, UMTS, cdma2000) capable of supporting multimedia applications to mobile end-users over IP. General Packet Radio Service (GPRS), which is an evolution of GSM, can support packet data (e.g., web browsing, email) in a cellular environment. Further evolution of GPRS, often referred to as the Universal Mobile Telecommunication System (UMTS), is expected to support real-time multimedia over IP (e.g., VoIP, video over IP, streaming media) in a cellular environment. In addition, the Third Generation Partnership Project (3GPP) has specified the IP Multimedia Subsystem (IMS) in UMTS to accomplish the control and service functions of wireless IP multimedia. In this regard, the 3GPP has adopted SIP as the signaling protocol in IMS. At the same time, in the cdma2000 world, the 3GPP2 has been developing the IP Multimedia Domain (MMD) to implement the control and service functions of wireless IP multimedia. The 3GPP2 has also adopted SIP into the MMD specification.

Given this evolution of wireless communications systems, the modern communications industry has brought about a tremendous expansion of wireline and wireless networks. Currently, a given mobile terminal may operate in more than one type of wireless network such as a WLAN as well as a cellular network. However, the presence of multiple wireless technologies in a communications system poses new problems and presents new opportunities for an operator or service provider to utilize and manage resources across these technologies. Additionally, mobile terminals operating in two different communications systems (i.e., dual mode) such as WLAN and cellular network may not be as efficient as desired in conserving power.

The Institute of Electrical and Electronics Engineering (IEEE) has defined a set of specifications for WLAN as 802.11x, where x denotes different specification groups. IEEE has defined three main methods for power saving in a WLAN, namely, PS-Poll, Scheduled Automatic Power Save Delivery (APSD) and unscheduled APSD. However, IEEE apparently defined the power save methods without considering the mobility aspect of a mobile terminal. Since 802.11 is primarily focused in providing wireless access to terminals such as laptop computers. Each of the three methods will be described below in turn:

PS-Poll Power Save: This technique is a basic polling based power save method specified in 802.11b. A station (STA) goes into "Doze" mode for a "ListenInterval" (multiple of the beacon transmission period), after indicating to the Access Point (AP) using a "Power Management" bit in the MAC header. When the AP has a Media Access Controller (MAC) Service Data Unit (MSDU) to deliver for the STA, it sends a Traffic Indication Map (TIM) for the STA. The STA wakes up after its "ListenInterval", and listens to the beacon. If it sees a TIM for itself, it sends PS-Poll to the AP. The AP, in turn, transfers data to the STA. If the STA does not see a TIM, it goes back to the "Doze" mode for another "ListenInterval".

Scheduled APSD: This method is specified in 802.11e. In this method, an AP only transmits the MSDU in a scheduled interval. The scheduled interval is set between AP and STA by exchanging a service interval and service start time. A STA only wakes up at the scheduled interval. 802.11e provides two QoS mechanisms: Enhanced Distributed Channel Access (EDCA) and Hybrid Control Channel Access (HCCA). EDCA is a contention-based mechanism. HCCA is a controlled based access mechanism. The scheduling works best on top of HCCA. Scheduling is difficult to achieve with the EDCA, due to its inherent contention based nature. This method is more suitable for HCCA.

Unscheduled APSD: This method is also specified in 802.11e. In this method, there is no prior scheduling setup between AP and STA. An AP indicates the traffic to the STA, similar to the PS-Poll method. The STA can wake up at any time and send a frame to the AP. When the AP receives any frame from the STA, it starts delivering MSDUs.

The above-described power save methods of a WLAN may be deficient for a mobile wearable device (e.g. voice or multimedia terminal) which changes APs quite frequently. For example, a WLAN has no dormancy capability, and thus, whenever the mobile terminal goes out of the coverage area of its current AP, the mobile terminal continuously tries to identify a beacon corresponding to a new AP. After finding a beacon, the mobile terminal performs WLAN Re-association with the new AP. These procedures drain the power resources (e.g. battery) in the mobile terminal. As a consequence, the battery life of the mobile terminal may be compromised resulting in dropped calls or more frequent charging of the battery by the end user which are often annoying to the end user.

In light of the shortcomings described above, there exists a need to provide a mobile terminal operating alternatively in a cellular network and a wireless network such as a WLAN (for example) with power consumption comparable to a mobile terminal operating only in a cellular network since such power consumption will be in line with the expectations of the users. It is readily apparent to one skilled in the art that the sleep mode in a cellular network (i.e., Paging Mode) is much more power efficient than the sleep mode (i.e., Doze Mode) in WLAN. As such, it would be advantageous for a dual mode mobile terminal capable of operating in a cellular network as well as a WLAN to utilize the cellular network interface in its sleep mode. However, a local area network, for example a WLAN network, owned by an enterprise, typically requires a mobile terminal operating in a dual mode to be primarily reached by their address in the WLAN network such that the WLAN network, not cellular network, is used while the terminal is in the WLAN coverage area. This requirement helps in reducing cellular operator charges and also helps in monitoring user activity. However, there are currently no techniques available for delivering/initiating call/session in a WLAN, while the mobile terminal is in the cellular sleep mode (i.e., no procedure for waking up a cellular dormant terminal in the WLAN). As such, the power savings afforded by cellular sleep mode cannot generally be taken advantage of while in a WLAN.

BRIEF SUMMARY

In light of the foregoing background, embodiments of the present invention provide methods, systems and computer program products for saving power of a mobile terminal capable of operating in a dual mode, such as in both a WLAN and a cellular network. Advantageously, the methods, systems and computer program products reduce the power consumption of a mobile terminal operating in a dual mode while effectively utilizing the coverage area of a proximity-based local area wireless network such as a WLAN. In this regard, when the mobile terminal detects coverage of a proximity-based wireless network such as a WLAN, the mobile terminal activates a corresponding interface and registers its state with a network entity such as a SIP server. The mobile terminal then deactivates its interface in the proximity-based wireless network (e.g. WLAN) and activates an interface to a cellular network and enters a low power consumption mode corresponding to the cellular network. If a call/session is directed to the mobile terminal while it is in the coverage area of the proximity-based local area wireless network such as the WLAN, the terminal is alerted via a wide area cellular network and the call/session is established via the proximity-based network. This allows a mobile terminal to utilize the low power consumption of a cellular network while effectively utilizing the coverage area of the proximity-based network.

In one exemplary embodiment, a method of saving power, at a mobile terminal is provided. The method initially detects coverage of a first communications network, namely, a local area network, by a mobile terminal and activates a first interface corresponding to the first communications network. The first interface is thereafter deactivated and a second interface corresponding to a second communications network is activated when the mobile terminal is serviced by the second communications network even though the mobile terminal also remains in a coverage area of the first communications network. Unlike the first local area network, the second communications network is a wide area network. A low power consumption mode supported by the second communications network is then entered upon activation of the second interface. Subsequently, the low power consumption mode may be deactivated and the first interface of the mobile terminal for communication with the first communications network may be reactivated when it is detected through the second interface, that a call/session is to be actuated with the mobile terminal via the first communications network.

In another exemplary embodiment, a method of saving power, at a mobile terminal, is provided. The method includes deactivating a second interface corresponding to a second communications network so as to enter a low power mode relative to a first communications network and activating a first interface corresponding to the first communications network and connecting to the first communications network for receiving a call/session transmitted by an Internet and Multi-Media Subsystem (IMS) contained within the first communications network.

Other embodiments may provide a system, a mobile terminal and a computer program product for saving power by activating a second interface to a second communications network, such as a cellular network, even though the mobile terminal is in the coverage area of a first communications network, such as a proximity-based network (e.g., WLAN).

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
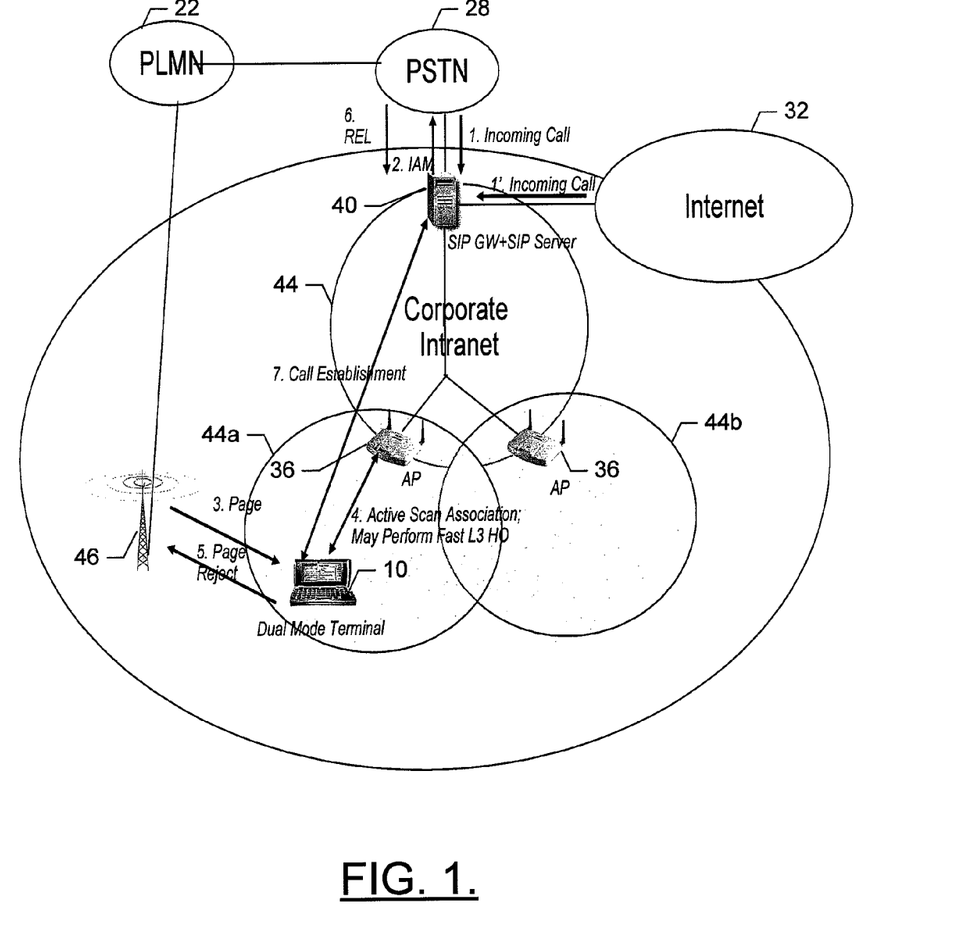
FIG. 1 is a schematic block diagram of a communications system according to one embodiment of the present invention.

Referring to FIG. 1, a mobile terminal 10, such as a dual mode terminal, is capable of transmitting signals to and receiving signals from a communications network, such as a circuit-switched cellular network that includes a base site or base station (BS) 46, a mobile switching center (MSC), (not shown) and other network entities required to operate the public land mobile network (PLMN). The MSC is capable of routing calls and messages to and from the mobile terminal when the mobile terminal is making and receiving calls. The MSC also controls the forwarding of messages to and from the mobile terminal. The MSC can be coupled to a data network, such as a local area network (LAN), a metropolitan area network (MAN), and/or a wide area network (WAN). As will be appreciated by those skilled in the art, the cellular network may also be referred to as a PLMN 22.

The PLMN 22 is capable of providing voice communication in accordance with a number of different circuit-switched techniques. In this regard, the PLMN is capable of providing voice communications in accordance with first, second, third-generation wireless communication protocols and the like. For example, the PLMN may provide voice communications in accordance with second-generation (2G) wireless communication protocols IS-136 (TDMA), GSM, and/or IS-95 (CDMA). Within the PLMN, signaling communications may be provided in accordance with any of a number of different techniques, but signaling communications are typically provided in accordance in accordance with the Signaling System 7 (SS7) standard.

The PLMN 22, can be coupled to a Public Switched Telephone Network (PSTN) 28 that, in turn is coupled to a network entity 40, such as a SIP server for example. Like the PLMN, the PSTN is capable of providing signaling communications in accordance with any number of different techniques, including SS7. The PSTN is also capable of providing voice communications in accordance with any of a number of different circuit-switched techniques. For example, the PSTN may provide voice communications in accordance with Time Division Multiplexing (TDM) techniques, such as 64 Kbps (CCIT), and/or Pulse Code Modulation (PCM) techniques, such as 56 Kbps (ANSI).

The PSTN 28 and the PLMN 22 (via the network entity 40) can also be coupled to, electrically connected to, or otherwise in electrical communication with a packet-switched network, such as an Internet Protocol (IP) network (e.g. Internet 32). The Internet 32 (or other IP Network) may be coupled to the mobile terminal 10. For example, the Internet 32 may be coupled to one or more wireless access points (APs) 36 (via the network entity 40), which may be coupled to the mobile terminal 10. As shown, the Internet 32 may be coupled to an Enterprise Network (e.g. Corporate Intranet) 44, which comprises another packet-switched network such as a local area network (LAN), for example, a Wireless LAN(WLAN), thereby providing communications in accordance with IEEE 802.11(e.g., 802.11a, 802.11b, 802.11g, 802.11n, etc.). The packet-switched network can equally comprise any of a number of other types of networks. For example, the packet-switched networks can comprise WiMax techniques such as IEEE 802.16, and/or ultra wideband (UWB) techniques such as IEEE 802.15 and the like without departing from the spirit and scope of the present invention. As such, the packet-switched networks can equally be configured to provide voice, text, multimedia communications and the like in accordance with the Internet Protocol (IP), for example, without departing from the spirit and scope of the present invention.

The IP networks (e.g. Internet 32 and Enterprise Network 44) may be capable of providing signaling communications in accordance with any of a number of different techniques. For example, the IP networks may be capable of providing signaling in accordance with the Session Initiation Protocol (SIP) (see, e.g., IETF request for comment document RFC 3261, entitled: *Session Initiation Protocol*, July 2002, the contents of which are hereby incorporated by reference in its entirety). In this regard, SIP typically provides signaling for initiating a session between two or more endpoints in the IP network by making those endpoints aware of the session semantics. Accordingly, devices (or users that run certain applications on these devices) are registered with the SIP backbone so that an invitation to a particular session can be correctly delivered to these endpoints. To achieve this, SIP provides a registration mechanism for devices and users, and it applies mechanisms such as a network entity (e.g., SIP server) 40 to route the session invitations appropriately.

To facilitate communications between the Internet 32, Enterprise Network 44, PLMN 22 and the PSTN 28, the communications system typically also includes a gateway (GW). For instance, the network entity 40 may include a gateway 50, such as a SIP GW (see, e.g., FIG. 3), that is capable of mapping signaling and voice communications between the Internet 32, Enterprise Network 44 and the PLMN 22 and/or PSTN 28 to thereby permit communications between the Internet 32, Enterprise Network 44, and the PLMN 22 and/or PSTN 28. As shown in FIG. 1, the network entity 40, such as a SIP server 40 may be contained within the Enterprise Network 44. In accordance with SIP, for example, the SIP GW may convert transmissions between a packet stream from an IP-network such as the Internet for example and the voice-encoded communication (e.g., TDM or PCM) from the PLMN and/or PSTN.

Also in accordance with SIP, the gateway 50 (see, e.g., FIG. 3) may operate to terminate SIP signaling. In addition to terminating SIP signaling, the gateway also typically performs conversion between SIP signaling in the IP networks (Internet 32 and Enterprise Network 44) and SS7 signaling in the PLMN 22 and/or PSTN 28, such as for call control.

Figure 2:
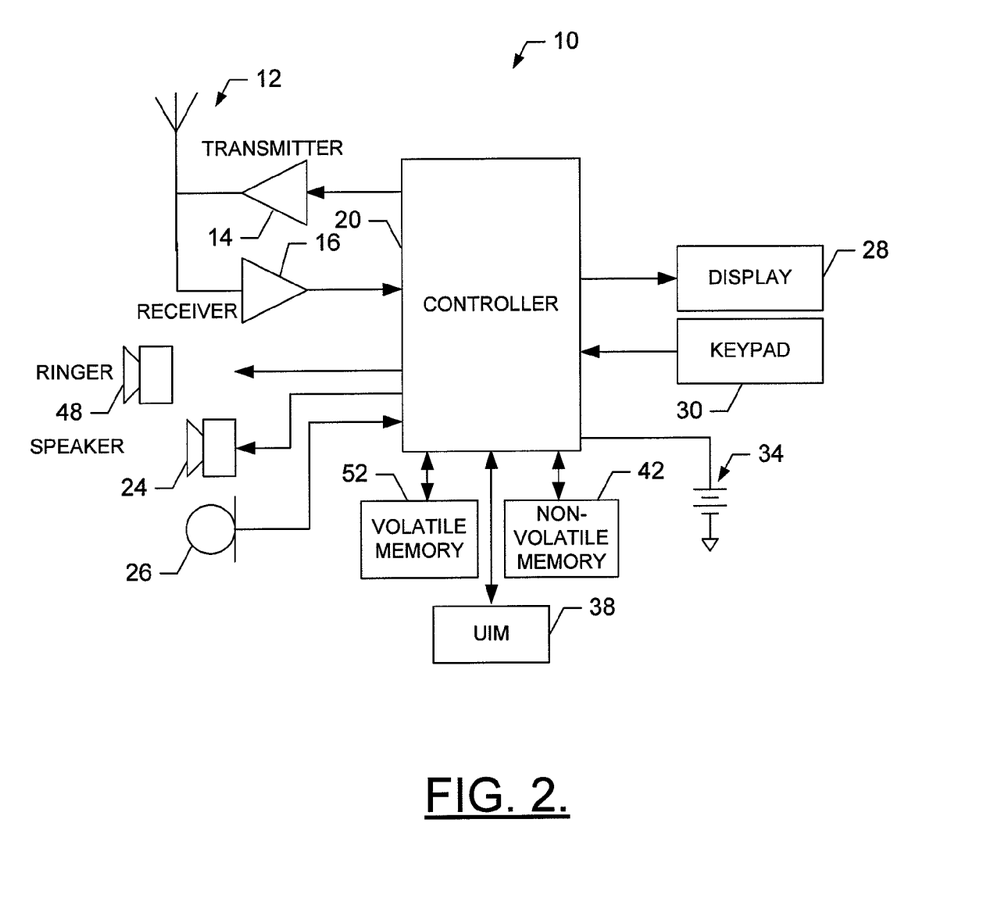
FIG. 2 is a schematic block diagram of one type of mobile terminal that would benefit from embodiments of the present invention.

Reference is now drawn to FIG. 2, which illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit their scope. While several embodiments of the mobile terminal 10 are illustrated and will be hereinafter described for purposes of example, other types of mobile terminals, such as portable digital assistants (PDAs), pagers, mobile televisions, laptop computers, gaming devices and other types of voice and text communications systems, can readily employ embodiments of the present invention.

In addition, while several embodiments of the method of the present invention are performed or used by a mobile terminal 10, the method may be employed by other than a mobile terminal. Moreover, the system and method of various embodiments will be primarily described in conjunction with mobile communications applications. It should be understood, however, that the system and method of the various embodiments can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. The mobile terminal 10 may be capable of operating in a wide area cellular network. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, and TD-SCDMA. Additionally, the mobile terminal can be capable of operating in accordance with any of a number of different wireless proximity-based networking techniques, including, LAN, WAN, WLAN techniques such as IEEE 802.11, WiMAX techniques such as IEEE 802.16, and/or ultra wideband (UWB) techniques such as IEEE 802.15 and the like. Thus, the mobile terminal 10 could operate in a wide area cellular network as well as a WLAN for example (i.e., dual mode). As known to those skilled in the art, a wide area network has a broader coverage area, generally by several orders of magnitude, than a local area network.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 48, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a universal identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 52, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 3:
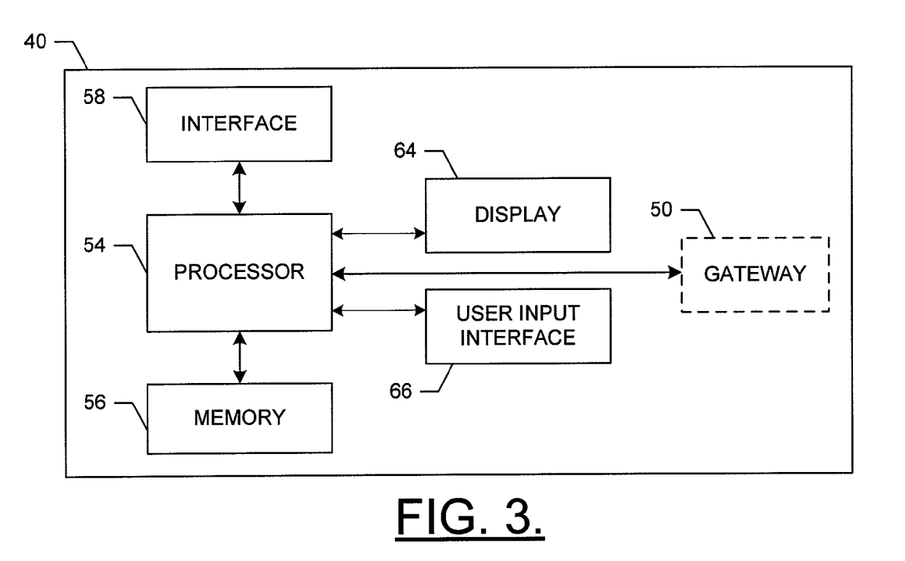
FIG. 3 is a schematic block diagram of a network entity capable of operating as a SIP server, in accordance with exemplary embodiments of the present invention.

As noted above, the system in which the mobile terminal 10 operates can include a SIP server 40. Now referring to FIG. 3, a block diagram of a network entity 40 capable operating as a SIP server is shown in accordance with one embodiment of the present invention. The SIP server 40 includes various means for performing one or more functions in accordance with exemplary embodiments of the present invention, including those more particularly described herein. It should be understood, however, that one or more of the entities may include alternative means for performing one or more like functions, without departing from the spirit and scope of the present invention. More particularly, for example, as shown in FIG. 3, the SIP server 40 can include a processor 54 connected to a memory 56. The memory can comprise volatile and/or non-volatile memory, and typically stores content, data or the like. For example, the memory typically stores content transmitted from, and/or received by, the SIP server 40. Also for example, the memory typically stores applications, instructions or the like for the processor to perform steps associated with operation of the SIP server 40 in accordance with embodiments of the present invention. In addition to the memory, the processor can also be connected to at least one interface or other means for displaying, transmitting and/or receiving data, content or the like. In this regard, the interface(s) can include at least one communication interface 58 or other means for transmitting and/or receiving data, content or the like, as well as at least one user interface that can include, for example, a display 64 and/or a user input interface 66. The interface can include a gateway 50 such as SIP GW, which may optionally be internal to the SIP server or externally located. The user input interface, in turn, can comprise any of a number of devices allowing the SIP server to receive data from a user, such as a keypad, a touch display, a joystick or other input device.

Referring again to FIG. 1, in accordance with embodiments of the present invention, the communications system is capable of allowing a mobile terminal 10, operating in a dual mode, such as in a LAN, for example a WLAN, and a cellular network, such as for example, a wide area cellular network, to reduce power consumption of the mobile terminal 10 by utilizing the sleep mode of the cellular network when the mobile terminal 10 is dormant. However, when the mobile terminal 10 is receiving/sending a call within the service area of the WLAN, such as the Enterprise Network 44, the mobile terminal 10 emerges from the sleep mode and begins to interface with the WLAN. While the following discussion is with respect to a dual mode mobile terminal operating in a WLAN and a wide area cellular network, it should be understood that the communications system and the mobile terminal 10 operating therein should not be limited in this manner. For instance, the mobile terminal 10 can be capable of operating in a number of different wireline or wireless proximity-based networking techniques in addition to or instead of WLAN including LAN, WiMAX techniques such as IEEE 802.16, UBW techniques such as IEEE 802.15 and the like. Based on the example of FIG. 1, the proximity-based network may also be referenced as an Enterprise Network 44, such as a corporate intranet. Additionally, in terms of the wide area cellular network, the mobile terminal 10 may be capable of operating in accordance with any number of first, second and/or third-generation communication protocols or the like. By way of illustration, the power saving methods of embodiments of the present invention will be explained below in terms of a call/ session to/from the mobile terminal 10, but first a discussion of the relevant functions of the SIP server 40 will be provided.

One of the roles of the SIP server 40 is to store information regarding the reachability of the mobile terminal 10 with respect to the cellular network or the Enterprise Network 44, for example. According to embodiments of the present invention, the mobile terminal 10 has four states which are stored in the SIP server 40. In the first state, "Sleeping in Cellular," the mobile terminal 10 is not present in the WLAN coverage area of the Enterprise Network 44 and thus, the mobile terminal 10 is not registered with the SIP backbone. Concerning the second state, "Active in Cellular," the mobile terminal 10 is active in a call/session in the cellular network. In the third state, "Registered in WLAN/Sleeping in Cellular," the terminal is present in the coverage area of the WLAN in the Enterprise Network 44, but it is also reachable via the cellular network. With respect to the fourth state, "Active in WLAN," the mobile terminal 10 is present in the WLAN coverage area and is reachable through the WLAN (i.e., the mobile terminal is active in a session in the WLAN). A fuller explanation regarding the third state, "Registered in WLAN/Sleeping in Cellular," is hereinafter provided since those skilled in the art fully appreciate and readily understand the other states.

When the mobile terminal 10 detects coverage of the Enterprise Network 44, i.e., when the mobile terminal 10 is within the service area of the WLAN or other proximity-based network, the mobile terminal 10 activates its WLAN interface and performs an Association procedure with a corresponding AP 36 and also performs SIP registration with the backbone of the SIP server 40. These procedures are required to register the reachabilty information for the mobile terminal in the Enterprise Network 44. As will be appreciated by those skilled in the art, both WLAN Association and SIP registration involve security procedures for authentication and authorization. By performing the security procedures outside of and prior to a call establishment procedure, latency during call establishment is minimized.

After performing WLAN Association and SIP registration, the mobile terminal 10 deactivates its WLAN interface and subsequently activates its cellular interface. Given that the mobile terminal 10 has its cellular interface activated, the mobile terminal 10 becomes dormant and enters a sleep mode in the cellular network known as "Paging Mode." The mobile terminal 10 is now registered with the SIP server 40 and sleeping in the cellular network. If the SIP registration is needed periodically, the mobile terminal 10 will perform the WLAN Association and SIP registration after each period, which can last for hours. The mobile terminal 10 and the SIP server 40 maintain the state "Registered in WLAN/Sleeping in Cellular" until circumstances change, that is until the mobile terminal 10 leaves the service area of the Enterprise Network and/or until the mobile terminal 10 receives or places a call, as described below.

When the user of the mobile terminal 10 initiates a call/session, the mobile terminal evaluates its current state. If the mobile terminal determines that the current state is "Registered in WLAN/Sleeping in Cellular," the mobile terminal 10 activates the WLAN interface based on the current state (thereby emerging from the sleep mode state in the cellular network) and sets up the call/session using the WLAN. For instance, the mobile terminal 10 performs WLAN Association and exchanges SIP signaling for establishing a call/session.

When a call/session is to be transmitted to the mobile terminal 10 through the WLAN, the call/session is routed to the mobile terminal 10 by the SIP server 40. As shown in FIG. 1, all incoming calls originated from either the circuit-switched (CS) cellular network (e.g. PLMN 22 or PSTN 28) or a packet-switched network such as Internet 32 are received and processed by the SIP server 40 located in the Enterprise Network 44. For instance, if the SIP server 40 receives an incoming call (Step 1, Step 1') from either the CS cellular network (e.g. PLMN 22 or PSTN 28) or a packet-switched network such as the Internet 32 and needs to deliver the call to the mobile terminal 10, the SIP server 40 looks up the current state of the mobile terminal 10. Provided that the current state (i.e., the Registered in WLAN/Sleeping in Cellular state) indicates that the mobile terminal 10 is listening in the CS cellular network, the SIP server 40 forwards the call toward the CS cellular network and sends an Initial Address Message (IAM) (Step 2) since the SIP server 40 is aware of the address associated with the mobile terminal 10 in the CS cellular network. The CS cellular network then pages the mobile terminal 10 via a Page message (Step 3). After receiving the Page message, the mobile terminal 10, based on the Registered in WLAN/Sleeping in Cellular state, establishes the WLAN connection so that the call/session can be set up on the WLAN. Given that the mobile terminal 10 established the WLAN connection, the mobile terminal 10 may perform an Active Scanning procedure to read the latest beacon from the WLAN prior to the WLAN Association/Re-association procedure as well as provide an IP Layer Handoff if the mobile terminal 10 has moved from one sub-IP network to another sub IP-network as described below (Step 4).

After successfully establishing connection in the WLAN, the mobile terminal 10 may send a Page Response with reject message (e.g., Page Reject) (Step 5) to the CS cellular network. For instance, if the cellular network is a cdma2000 (i.e., IS-136) network, the mobile terminal 10 may send a Page Response with Null Service Option message to the CS cellular network to indicate that the user of the mobile terminal 10 is not interested in the call (at least not via the cellular network). It should be pointed out that sending of a reject response from the mobile terminal 10 is optional and that the mobile terminal 10 need not send anything in response to a Page sent from the CS cellular network. For instance, the CS cellular network will eventually timeout for the receipt of Page Response and the CS cellular network will eventually send an Integrated Services Digital Network (ISDN) User Part ISUP REL message to the SIP gateway 50 (Step 6). The CS cellular network will also send the ISUP REL message to the SIP gateway 50 in the situation where the CS cellular network received a Page Reject message sent from the mobile terminal 10. The ISUP REL message indicates that the CS cellular network is being released and is ready to be put in an idle state.

The SIP server 40 may send a message back to the calling party (e.g., '100 Trying' message) while the SIP server 40 is in the process of delivering the call/session to the mobile terminal 10. This procedure takes care of any timer started at the calling party for response. The SIP server 40 also delivers a SIP INVITE message (not shown) to the mobile terminal 10, via the CS cellular network (e.g. PLMN 22 and/or PSTN 28), after receiving an indication that the mobile terminal 10 is reachable in the WLAN. The purpose of the SIP INVITE message is so that the mobile terminal 10 can join a session in the Enterprise Network 44 and thereby set up the call/session (originated in the CS cellular network or Internet for example) in the WLAN of the Enterprise Network 44. Once the mobile terminal 10 sends a positive SIP Response message (not shown) back to the SIP server 40, the SIP server 40 redirects the call to the mobile terminal 10 via the WLAN and the call is established (Step 7).

It should be noted that there are at least two ways to indicate to the SIP server 40 that the mobile terminal 10 has established the necessary connections to the WLAN and is thereby reachable in the WLAN. Regarding the first scenario, receipt of the ISUP REL message by the SIP server 40, which is sent from the CS cellular network, may serve as the indication to the SIP server 40 that the mobile terminal 10 has established the necessary connection to the WLAN. In this situation, if the mobile terminal 10 did not explicitly reject the Page message (i.e., the cellular network timed out for receipt of the Page response), then the cellular network would take some time in realizing the Page failure and transmission of the ISUP REL message to the SIP gateway 50. Typically, the CS cellular network would try to make a number of Page retransmissions, provided that the mobile terminal 10 does not respond within a predetermined duration. It should be pointed out, however, that the time elapsed in Page failure is dependent on the particular cellular technology as well as the Page retransmission configuration (e.g., timeout and number of retries) corresponding to a particular operator network. On the other hand, if the mobile terminal 10 explicitly rejected the Page message sent from the CS cellular network, then the mobile terminal 10 must reactivate its cellular interface after activation of its WLAN interface in order to send the Page Reject message.

Figure 4:
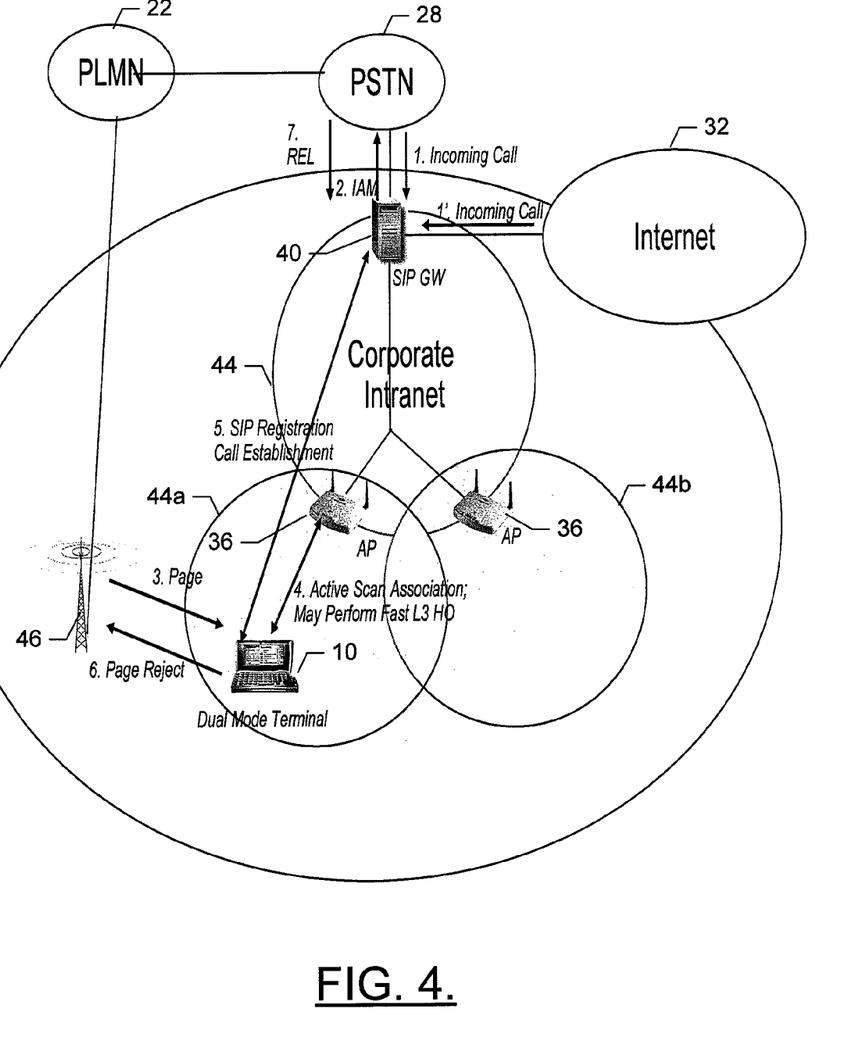
FIG. 4 is a schematic block diagram of a communications system according to an alternative exemplary embodiment of the present invention.

The second way to indicate to the SIP server 40 that the mobile terminal 10 has established the necessary connections to the WLAN and thereby indicate that it is reachable in the WLAN is shown in FIG. 4, which illustrates an exemplary alternative embodiment of the present invention. This alternative embodiment of the present invention is similar in operation to the embodiment of FIG. 1, except that after the mobile terminal 10 establishes the necessary connections to the WLAN, the mobile terminal 10 may automatically refresh the SIP registration with the SIP server 40, which indicates to the SIP server 40 that the mobile terminal 10 is reachable in the WLAN. The mobile terminal 10 sends the indication that it is reachable in the WLAN to the SIP server 40 immediately upon establishing connection to the WLAN, and as a consequence the SIP server 40 can send the SIP INVITE faster than the aforementioned scenario in which the mobile terminal 10 does not explicitly reject the Page message (e.g., timeout of the CS cellular network).

As shown in FIG. 1, the Enterprise Network 44 of the present invention is capable of supporting multiple IP sub-networks. For instance, the mobile terminal may move out of one IP sub-network 44a and enter into another IP sub-network 44b, after SIP Registration has occurred. In this scenario, the mobile terminal 10 performs an IP Layer Handoff (HO) using Mobile IP Fast Handoff techniques. The Mobile IP Fast Handoffs typically require Layer 2 to provide the trigger. With respect to embodiments of the present invention, the Layer 2 triggers are "Initiation of Call" or "Reception of Page" messages by the mobile terminal 10. As will be appreciated by those skilled in the art, the Fast Handoff techniques have reduced latency compared to conventional Mobile IP Handoff techniques and will not add any significant noticeable latency in the overall call initiation or call delivery. It should also be pointed out that the initial call setup can easily tolerate a few seconds of delay without impacting user perception. As such, embodiments of the present invention may utilize a conventional Mobile IP Handoff.

Figure 5:
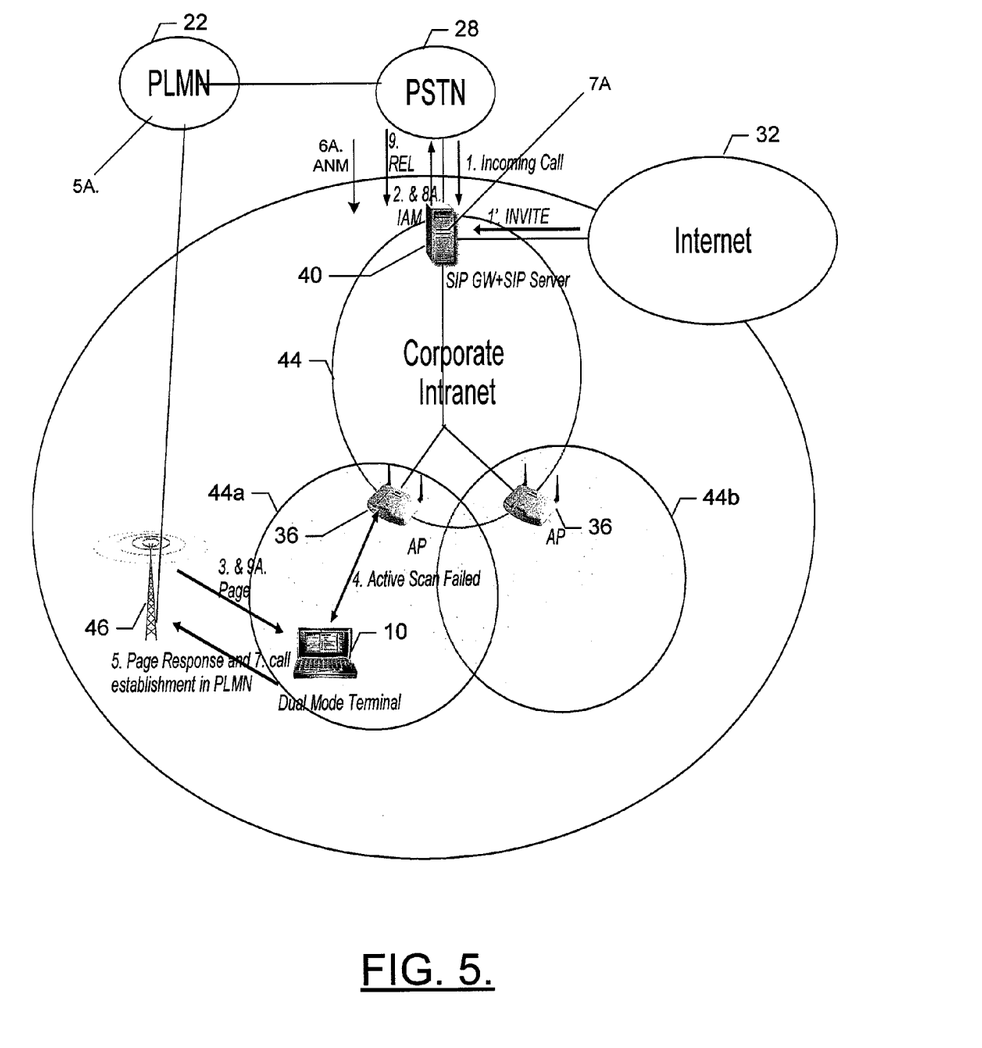
FIG. 5 is a schematic block diagram of a communications system which illustrates call delivery through a cellular network when there is a failure in a WLAN.

Referring now to FIG. 5, call delivery through the CS cellular network is illustrated when there is a failure in WLAN connection. Steps 1, 1' and Step 2 are the same as those as described above with respect to FIG. 1 and the explanation of each is not repeated. In this scenario however, the mobile terminal 10, after SIP registration, may have moved out of the WLAN coverage area. After receiving a Page message (Step 3), the mobile terminal 10 may not be able to establish a WLAN connection and an Active Scan by the mobile terminal 10 for the WLAN may fail. (Step 4) In this situation, the mobile terminal 10 should establish the call through the CS cellular network. To effectuate this result, the mobile terminal 10 sends a Page Response with Accept instead of Page Reject in the CS cellular network, after not receiving a WLAN Probe Response from the WLAN (Step 5). The SIP gateway 50 will receive ISUP Answer Message (ANM) (Step 6) from the CS cellular network. The SIP server 40 then delivers the call to the mobile terminal 10 through the CS cellular network (Step 7).

It should be understood, however, that depending on the particular cellular technology or operator specific configuration, the mobile terminal 10 may expend a great deal of time waiting for the WLAN Probe Response, and thus may not be able to send a Page Response with accept before the CS cellular network times out (Step 5A). This situation may result in transmission of an ISUP REL (Step 6A) message sent from the CS cellular network to the SIP server 40. As discussed above with respect to FIG. 4, in an exemplary embodiment of the present invention a mobile terminal 10 may automatically refresh the SIP Registration with the SIP server 40 to indicate that the mobile terminal 10 established the necessary connections to the WLAN. However, when the mobile terminal 10 is not present in the WLAN or has moved out of the WLAN after receipt of a Page message, the SIP server 40 will not be able to obtain a SIP Registration from the mobile terminal 10 and thus, the SIP server 40 will not send a SIP INVITE to the mobile terminal 10 (Step 7A). Despite this fact, the SIP server 40 could be configured such that it has a predetermined delay for receipt of the SIP Registration and after the predetermined delay, the SIP server 40 will forward the call again through the CS cellular network (Step 8A). When the mobile terminal 10 fails to establish the WLAN connection and receives a second consecutive Page message (Step 9A) from the CS cellular network, the mobile terminal 10 does not attempt the WLAN connection and establishes the cellular network connection immediately.

On the other hand, in the situation where receipt of the ISUP REL message by the SIP gateway 50 serves as an indication to the SIP server 40 that the mobile terminal 10 is connected to the WLAN (i.e., the first scenario described above), the SIP server 40 will send the SIP INVITE message without realizing that the mobile terminal is not connected to the WLAN. When the SIP server 40 does not receive a SIP Response message back from the mobile terminal 10 within a predetermined time, the SIP server 40 will then forward the call through the CS cellular network.

In an alternative exemplary embodiment of the present invention, a mobile terminal 10 need not detect WLAN coverage and register itself in the SIP server 40. In such instances, the call is always delivered through the CS cellular network first. The mobile terminal 10 probes for a WLAN and if the mobile terminal 10 finds a WLAN, it completes the call through the WLAN. Otherwise, the mobile terminal 10 completes the call through the CS cellular network. This process consumes more power than the embodiments of the present invention which are described above, because for every call initiation/delivery the mobile terminal 10 is probing for a WLAN regardless of whether the mobile terminal 10 is actually present in a WLAN coverage area.

Figure 6:
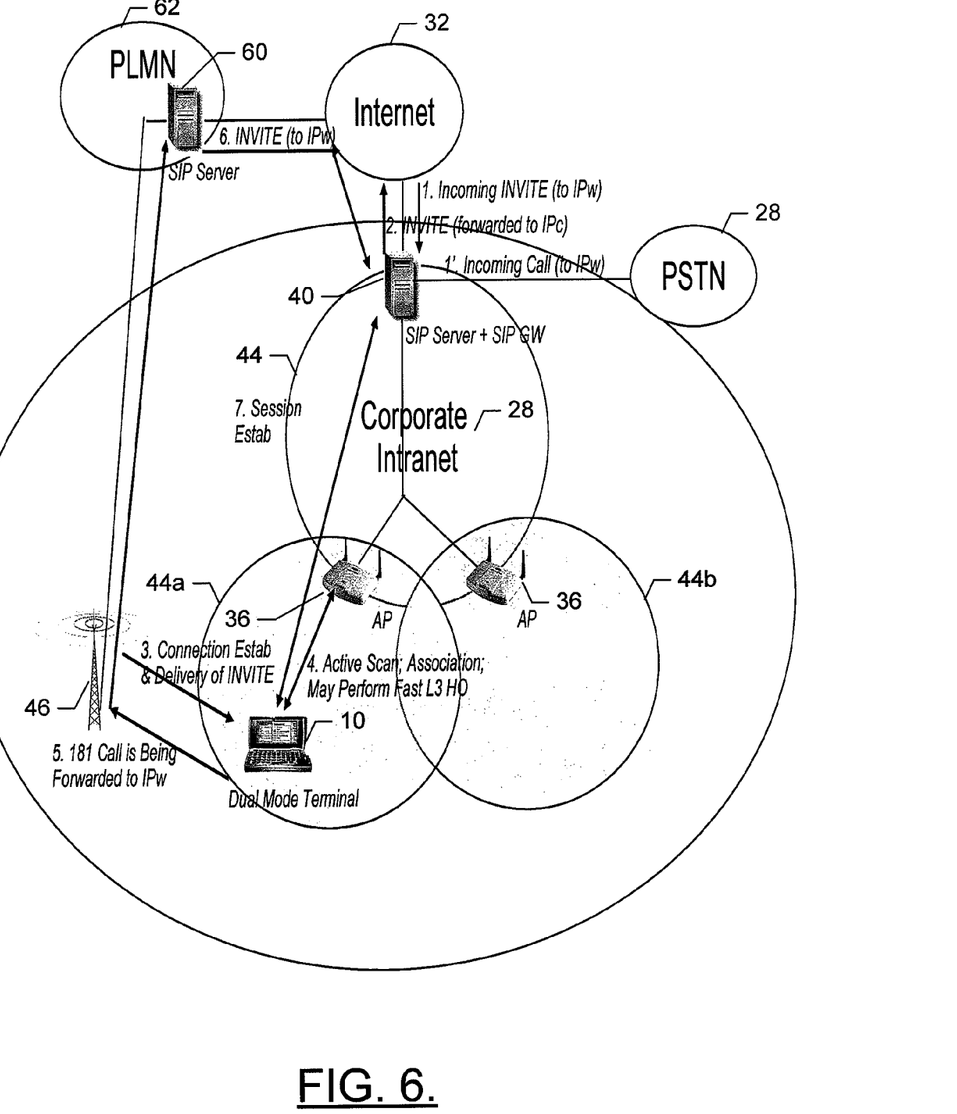
FIG. 6 is a schematic block diagram of a communications system utilizing a packet-switched (PS) cellular network according to an exemplary embodiment of the present invention.

Referring now to FIG. 6, a communications system utilizing a packet-switched cellular network according an exemplary embodiment of the present invention is shown. More particularly, FIG. 6 shows the call/session delivery to the mobile terminal 10 through a packet-switched (PS) cellular network 62 when the mobile terminal is in the "Registered in WLAN/Sleeping in Cellular" state. It should be understood that the primary difference in operation between this embodiment of the present invention and the embodiments of the present invention described above which utilize a CS cellular network (as opposed to a PS cellular network) differ mainly in terms of session delivery to the mobile terminal 10. The packet-switched (PS) cellular network 62 has an Internet and Multi-Media Subsystem (IMS) (not shown) which comprises a SIP server 60. The IMS is connected to the WLAN via a packet-switched network (e.g., IP Network) such as the Internet 32. The Enterprise Network 44 also has a network entity such as a SIP server 40 that may also have a SIP gateway 50 which receives all incoming calls/sessions. For instance, the SIP server 40 may receive an incoming call/session from a PSTN 28 which contains information corresponding to the IP address of the mobile terminal 10 in WLAN (IPw) (Step 1'). Additionally, the SIP server 40 may receive a call/session such as SIP INVITE (Step 1). After the SIP server 40 detects that the mobile terminal is in the "Registered in WLAN/Sleeping in Cellular" state, the SIP server 40 forwards the call/session to the IP address of the mobile terminal 10 in the PS cellular network 62 (IPc) (Step 2). The call reaches the SIP server 60 in the IMS of the PS cellular network 62 and the SIP server 60 establishes the necessary connections with the cellular interface of the mobile terminal 10. The PS cellular network 62 sends a Page message to the mobile terminal 10 and the SIP Server 60 delivers a SIP INVITE message to the mobile terminal 10. After receipt of the Page and SIP INVITE messages (Step 3), the mobile terminal 10 establishes the necessary connections in the WLAN. The mobile terminal 10 may then perform an active scan procedure to identify the latest beacon from the WLAN (Step 4). The mobile terminal 10 then sends a SIP Response to the PS cellular network 62 which contains the IP address of the mobile terminal 10 in the WLAN (IPw) (Step 5). For instance, the SIP Response could be a '181 Call is Being Forwarded' message or a '302 Moved Temporarily' message. The SIP server 60 receives this SIP Response and redirects the call (and/or session) to the IP address of the mobile terminal in the WLAN (IPw) (Step 6). In this manner, the incoming call/session is delivered in the WLAN to the mobile terminal 10 via the WLAN (Step 7).

Figure 7:
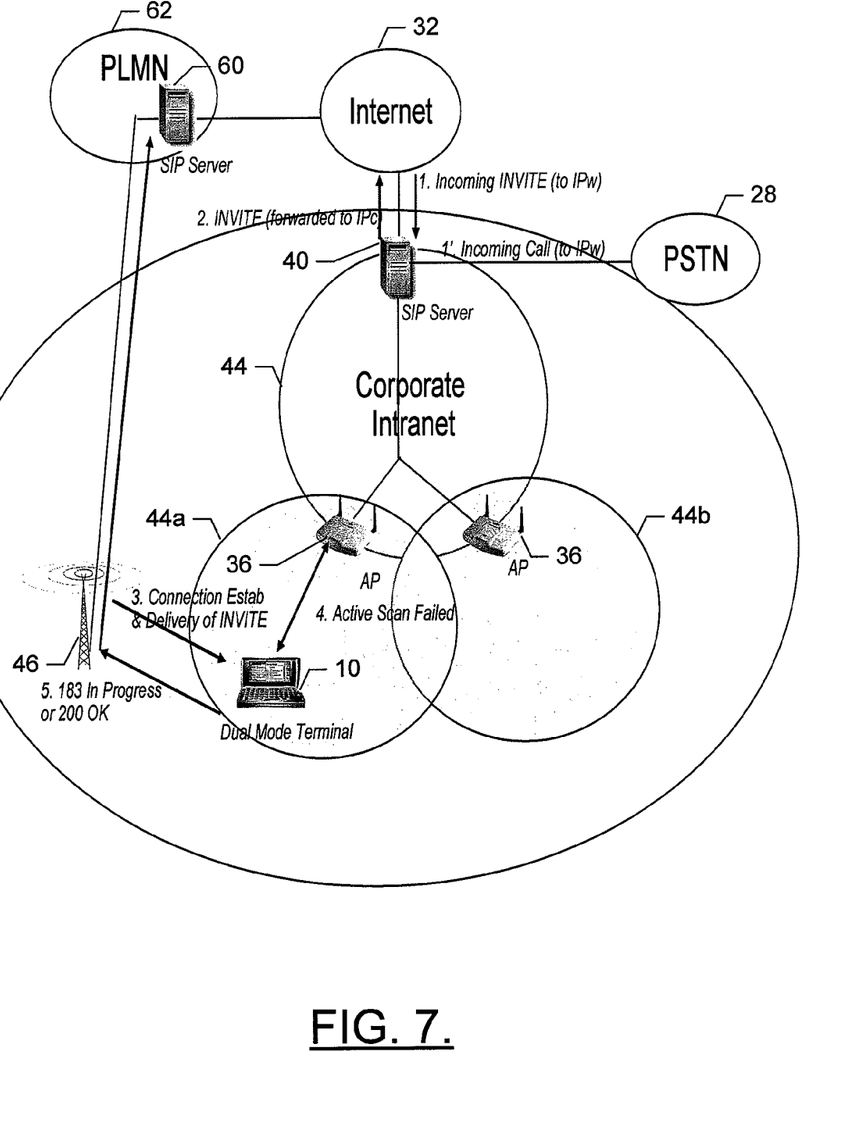
FIG. 7 is a schematic block diagram of a communications system which illustrates call delivery through a PS cellular network when there is a failure in a WLAN.

In regards to FIG. 7, an exemplary embodiment of a method of delivering a call through a packet-switched (PS) cellular network is depicted when there is a failure in the WLAN connection. As shown in FIG. 7, the SIP server 40 forwards an incoming call to the IP address of the mobile terminal 10 in the PS cellular network 62 (Steps 1-2). The SIP Server 60 establishes the necessary connections with the cellular interface of the mobile terminal 10, and delivers Page and SIP INVITE messages to the mobile terminal 10 (Step 3) but the mobile terminal 10 fails to establish the necessary WLAN connection. As a consequence, the active scan procedure of the mobile terminal 10 is unsuccessful (Step 4). In such a situation, the mobile terminal 10 sends a positive SIP Response such as a '183 In Progress' or '200 OK' message to the PS cellular network 62 (Step 5). The call/session is then completed via the PS cellular network 62.

The above described functions may be carried out in many ways. For example, any suitable means for carrying out each of the functions described above may be employed to carry out embodiments of the invention. In one embodiment, all or a portion of the elements of embodiments of the invention generally operate under control of a computer program product. The computer program product for performing the methods of embodiments of the invention includes computer-readable storage medium, such as non-volatile storage medium, and computer-readable program code portions, such as a series of computer instructions, embodied in the computer-readable storage medium. Typically, both the mobile terminal 10 as well as various network entities, such as the SIP server 40, include complimentary computer programs for communicating with one another to effectuate the various embodiments of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    detecting coverage of a first communications network by an apparatus and activating a first interface corresponding to the first communications network, wherein the first communications network comprises a local area network;
    deactivating the first interface and activating a second interface corresponding to a second communications network in an instance in which the apparatus is serviced by the second communications network even though the apparatus also remains in a coverage area of the first communications network, wherein the second communications network comprises a wide area network;
    entering a low power consumption mode supported by the second communications network upon activation of the second interface;
    deactivating the low power consumption mode and activating the first interface of the apparatus for facilitating communications with the first communications network in response to detecting, through the second interface, that at least one call or session is to be actuated with the apparatus via the first communications network; and
    directing transmission of a response through the second interface to the second communications network in response to the detecting that at least one call or session is to be actuated with the apparatus via the first communications network.

2. A method according to claim 1, wherein the first communications network comprises a packet-switched network and the second communications network comprises a cellular network.

3. A method according to claim 1, wherein the first communications network comprises an Enterprise network which comprises a wireless local area network and the second communications network comprises a cellular network.

4. A method according to claim 1, wherein the first communications network comprises an Enterprise Network which comprises a WiMax network corresponding to Institute of Electrical and Electronics Engineering 802.16.

5. A method according to claim 1, further comprising identifying at least one predetermined state of the apparatus based upon reachability of the apparatus in the first and second communications systems.

6. A method according to claim 1, further comprising:
    facilitating receipt of at least one call or session at a Session Initiation Protocol server; and facilitating transmission of the at least one call or session from the Session Initiation Protocol server via the first communications network to the apparatus after the second communications network facilitates transmission of a message to the Session Initiation Protocol server identifying that the second communications network is released and is ready to be placed in an idle state.

7. A method according to claim 1, further comprising;
facilitating receipt of at least one call or session at a Session Initiation Protocol server; and
permitting the apparatus to automatically refresh a Session Initiation Protocol Registration with the Session Initiation Protocol server after the apparatus is connected to the first communications network to thereby facilitate transmission of a message to the apparatus, the message indicates that the apparatus is invited to participate in a session.

8. A method according to claim 3, wherein the Enterprise Network comprises one or more sub-Internet Protocol networks and when the apparatus moves from a first sub-Internet Protocol network to a second sub-Internet Protocol network, the method further comprises facilitating handover of the apparatus by the first sub-Internet Protocol network to the second sub-Internet Protocol network.

9. A method according to claim 1, further comprising;
facilitating transfer of the apparatus from the coverage area of the first communications network; and
facilitating connection of the at least one call or session via the second interface corresponding to second communications network.

10. A method according to claim 1, wherein the second communications network comprises a packet-switched cellular network which comprises an Internet and Multi-Media Subsystem having a second network entity, and wherein the method further comprises facilitating transmission of the at least one call or session from the second network entity to the apparatus.

11. A computer program product comprising at least one tangible computer-readable storage medium having computer-readable program code portions stored therein, the computer-readable program code portions comprising:
a first executable portion for detecting coverage of a first communications network and activating a first interface corresponding to the first communications network, wherein the first communications network comprises a local area network;
a second executable portion for deactivating the first interface and activating a second interface corresponding to a second communications network in an instance in which an apparatus is serviced by the second communications network even though the apparatus also remains in a coverage area of the first communications network wherein the second communications network comprises a wide area network;
a third executable portion for entering a low power consumption mode supported by the second communications network upon activation of the second interface;
a fourth executable portion for deactivating the low power consumption mode and activating the first interface of the apparatus for facilitating communications with the first communications network in response to detecting, through the second interface, that at least one call or session is to be actuated with the apparatus via the first communications network; and
a fifth executable portion for directing transmission of a response through the second interface to the second communications network in response to the detecting that at least one call or session is to be actuated with the apparatus via the first communications network.

12. A computer program product according to claim 11, further comprising a fifth executable portion for identifying at least one predetermined state of the apparatus based upon reachability of the apparatus in the first and second communications systems.

13. A computer program product according to claim 12, further comprising a sixth executable portion for facilitating transfer of the apparatus from the coverage area of the first communications network and facilitating connection of the at least one call or session via the second interface corresponding to second communications network.

14. An apparatus comprising:
at least one processor; and
at least one memory including computer program code, the at least one memory and the computer program code configured to, with the at least one processor, cause the apparatus to perform at least the following:
detect coverage of a first communications network and activate a first interface corresponding to the first communications network, wherein the first communications network comprises a local area network;
deactivate the first interface and activate a second interface corresponding to a second communications network in an instance in which the apparatus is serviced by the second communications network even though the apparatus also remains in a coverage area of the first communications network, wherein the second communications network comprises a wide area network;
enter a low power consumption mode supported by the second communications network upon activation of the second interface;
deactivate the low power consumption mode and activate the first interface of the apparatus for facilitating communications with the first communications network in response to detecting, through the second interface, that at least one call or session is to be actuated with the apparatus via the first communications network; and
direct transmission of a response through the second interface to the second communications network in response to the detecting that at least one call or session is to be actuated with the apparatus via the first communications network.

15. An apparatus according to claim 14, wherein the first communications network comprises an Enterprise network which comprises a wireless local area network and the second communications network comprises a cellular network.

16. An apparatus according to claim 14, wherein first communications network comprises an Enterprise Network which comprises a WiMax network corresponding to Institute of Electrical and Electronics Engineering 802.16.

17. A communications system comprising:
an apparatus according to claim 14; and
a network entity configured to identify at least one predetermined state corresponding to the apparatus, the at least one predetermined state comprises information relating the reachability of the apparatus in a first communications system and a second communications systems.

18. A communications system according to claim 17, wherein the network entity is a Session Initiation Protocol server and the Session Initiation Protocol server is configured to facilitate transmission of the at least one call or session corresponding to the first communications network to the apparatus after the second communications network facilitates transmission of a message to the Session Initiation Protocol server, the message identifies that the second communications network is released and is ready to be placed in an idle state.

19. A communications system according to claim 17, wherein the first network entity is a Session Initiation Protocol server and the apparatus automatically refreshes a Session Initiation Protocol Registration with the Session Initiation Protocol server after the apparatus is connected to the first communications network to thereby facilitate transmission of a message to the apparatus, the message indicates that the apparatus is invited to participate in a session.

20. A communications system according to claim 17, wherein when the apparatus departs from the coverage area of the first communications network and the network entity is configured to facilitate connection of the at least one call or session via the second interface corresponding to the second communications network.

21. A communications system according to claim 17, wherein the second communications network is a packet-switched cellular network which comprises an Internet and Multi-Media Subsystem having another network entity, the another network entity is configured to facilitate transmission of the at least one call or session to the apparatus.

\* \* \* \* \*